(12) United States Patent
Wood et al.

(10) Patent No.: US 7,624,038 B1
(45) Date of Patent: Nov. 24, 2009

(54) INTERACTIVE REWARD SYSTEM AND METHOD

(75) Inventors: Rahn Wood, Como (AU); Charles Edward Breese, Redfern (AU)

(73) Assignee: The Internet Money Exchange Pty Ltd, Sydney (AU)

( * ) Notice: Subject to any disclaimer, the term of this patent is extended or adjusted under 35 U.S.C. 154(b) by 855 days.

(21) Appl. No.: 09/298,763

(22) Filed: Apr. 23, 1999

(51) Int. Cl.
*G06Q 30/00* (2006.01)
(52) U.S. Cl. ........................................................ 705/14
(58) Field of Classification Search .................... 705/14
See application file for complete search history.

(56) References Cited

U.S. PATENT DOCUMENTS

| | | | |
|---|---|---|---|
| 5,502,636 A | 3/1996 | Clarke | 364/401 |
| 5,515,098 A | 5/1996 | Carles | 348/8 |
| 5,612,868 A | 3/1997 | Off et al. | 364/214 |
| 5,710,886 A | 1/1998 | Christensen et al. | 395/214 |
| 5,740,549 A * | 4/1998 | Reilly et al. | 705/14 |
| 5,761,648 A | 6/1998 | Golden et al. | 705/14 |
| 5,809,242 A | 9/1998 | Shaw et al. | 395/200.47 |
| 5,838,790 A | 11/1998 | McAuliffe et al. | 380/4 |
| 5,848,397 A | 12/1998 | Marsh et al. | 705/14 |
| 5,855,007 A * | 12/1998 | Jovicic et al. | 705/14 |
| 5,905,246 A | 5/1999 | Fajkowski | 235/375 |
| 6,009,411 A * | 12/1999 | Kepecs | 705/14 |
| 6,009,412 A | 12/1999 | Storey | 705/14 |
| 6,014,634 A | 1/2000 | Scroggie et al. | 705/14 |
| 6,041,309 A | 3/2000 | Laor | 705/14 |
| 6,237,145 B1 * | 5/2001 | Narasimhan et al. | 725/23 |
| 6,256,614 B1 * | 7/2001 | Wecker et al. | 705/14 |

OTHER PUBLICATIONS

Definition of "register" (v), Merriam-Webster's Online Dictionary, accessed Jan. 12, 2004 at http://www.search.eb.com/.*

(Continued)

*Primary Examiner*—Donald L Champagne
(74) *Attorney, Agent, or Firm*—Kenyon & Kenyon LLP

(57) ABSTRACT

An interactive reward system to allow a user to collect and redeem rewards is disclosed. The system can operate over the Internet or any other network of linked mirco-processors which can reference a database. The user can obtain rewards when using a user computer. A reward can be obtained when the user selects an image or text, such as an advertisement, that has an associated (optional) reward indicator. A reward indicator can be, for example, a special logo or icon. When an image with a reward indicator is selected by the user, control is passed to a central computer that identifies the user and adds the reward to a database storing a list of rewards available for redemption by that user. Each reward is associated with a promoter's offer. Typically, each promoter will have a computer, such as a webserver. After a reward has been allocated to the user, the central computer passes control to the promoter's computer associated with the selected image. The users can access the central computer to see what rewards the user has collected, to transfer rewards, and to redeem rewards or to print reward coupons for redemption in a physical outlet. Rewards can also be redeemed at the promoter's computer, which will communicate with the central computer to ascertain if the selected reward is valid. The system has application to other networked devices other than the Internet, such as ATMs and telephones.

6 Claims, 7 Drawing Sheets

OTHER PUBLICATIONS

Definition of "collect" (v), Merriam-Webster Online Dictionary, accessed Mar. 1, 2008 at http://www.merriam-webster.com/.*
"My Points", www.dv2u.com, Jan. 30, 2000, 7 pages.
www.ebates.com, Jan. 31, 2000, 5 pages.
www.webstakes.com, Jan. 31, 2000, 1 page.
"Prio.net", www.savesmart.com/home_content.html, Jan. 31, 2000, 1 page.
www5.coolsavings.com, Jan. 30, 2000, 11 pages.
www.e-centives.com, Jan. 30, 2000, 3 pages.
www.clickrewards.com, Jan. 30, 2000, 4 pages.
www.cybergold.com, Jan. 30, 2000, 8 pages.
www.freeride.com, Jan. 30, 2000, 11 pages.

* cited by examiner

Fig. 6

| Promoter Table | Offer Table |
|---|---|
| • PromoterID<br>• Name<br>• Address<br>• Suburb<br>• City<br>• State<br>• Zip<br>• Country<br>• Company Name<br>• Email address<br>• Phone Number | • OfferID<br>• PromoterID<br>• Type<br>• Status<br>• Code<br>• Details<br>• StartDate<br>• EndDate<br>• Can Copy<br>• Can Send<br>• Can Print<br>• HTTP Cod |
| Reward Table | User Table |
| • OfferID<br>• UserCode<br>• DateAcquired<br>• RedeemStatus | • UserCode<br>• CustomerID<br>• AccessCode |

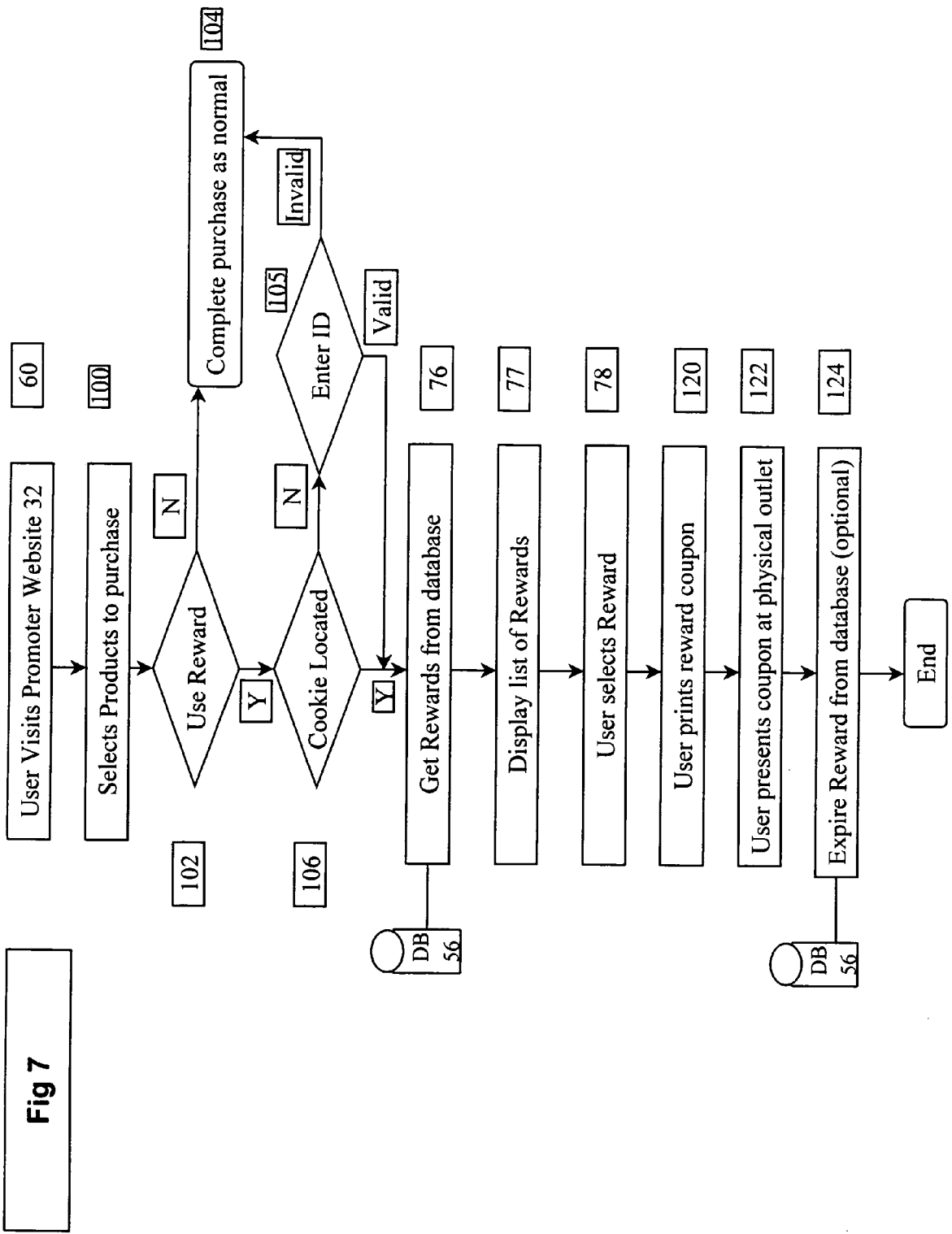

INTERACTIVE REWARD SYSTEM AND METHOD

FIELD OF INVENTION

The present invention is directed to a computerized interactive offer and reward processing system, and more particularly, to a coupon issuance and redemption system for use in interactive mediums such as the Internet.

COPYRIGHT NOTICE

A portion of the disclosure of this patent document contains material which is subject to copyright protection. The copyright owner has no objection to the facsimile reproduction by anyone of the patent document or patent disclosure as it appears in the Patent and Trademark Office patent file or records, but otherwise reserves all copyright rights whatsoever.

BACKGROUND OF THE INVENTION

In recent years, there has been enormous growth in Internet and online shopping and other online consumer transactions. Additionally, many "regular" businesses have created websites to promote their products and services. Businesses, especially e-commerce businesses, have the need to attract customers to their websites. One common way to attract Internet customers to a website is to advertise on other websites.

In the Internet environment, a typical advertisement on a website is what is known as a banner advertisement. A banner advertisement can be an advertisement that appears towards the top or bottom of a webpage on a website. Microsoft Press, Computer Dictionary, 3rd Edition, defines a banner to be a section of a webpage containing an advertisement that is usually an inch or so tall and spans the width of the webpage. The banner contains a link to the advertiser's website. Thus, a banner advertisement has an webpage associated with it, which is usually the webpage at the website of the advertiser. When a user selects the banner advertisement, for example, by clicking on the banner advertisement, the user is taken to the webpage associated with the advertisement. That is, when a user clicks on the banner advertisement, the webpage specified in the banner advertisement is downloaded to the user's computer for viewing by the user's Internet browser program.

In this document, the term "interact with" will be used as a generic description of the process of selecting or clicking on an advertisement or other interactive image in order to be taken to a webpage (or other output display) or to have displayed further information regarding or associated with the advertisement.

There are other types of advertisements that can be utilized on the Internet. Presently, banner advertisements are one of the most common forms of Internet advertising.

The value of Internet advertising to a business can be seen in the following two examples. Juno Online is a "free" email service and is said to be the second largest Internet Service Provider (ISP) in the United States. It is financially supported through electronic advertising. See U.S. Pat. No. 5,809,242 to D. E. Shaw et. al. See also U.S. Pat. Nos. 5,838,790 and 5,848,397. Geocities is a popular service that hosts websites for "free". It is financially supported by advertisers. Each user who creates a "free" website that is hosted by Geocities agrees to allow Geocities to include banner advertisements on the user's website.

However, with the growth of Internet advertisements, and because banner and other Internet advertisements are becoming quite common, Internet users have become more discerning as to which advertisements they react to. Accordingly, the "click-through" rate for many Internet advertisements is decreasing. (The click-through rate is the number of users who select the advertisement by clicking on it divided by the total number of users to whom the advertisement is displayed.)

As a result, there is a need for an incentive scheme to reward users who interact with banner and other Internet advertisements.

Various promotional programs have been implemented to attract consumers to websites. For example, cybergold.com has a scheme that allows users to establish a cybergold account. Points will accrue in the account when the user performs various functions, such as visiting a website, interacting with an advertisement or purchasing a product. These points can be redeemed to purchase products. Netcentives.com is a promotional program that allows users to earn points for completing activities on websites. Users can earn points for doing things like purchasing products, downloading software and completing surveys. These types of schemes have had limited success due to their complexity, the need to pre-register and establish an account and the difficulty of redeeming points for products.

Electronic coupon systems have been proposed as a marketing tool. One example is the marketing network and process described in a patent by Golden et. al., U.S. Pat. No. 5,761,648. However, that system has a number of deficiencies. The coupons are not associated with advertisements, and so do not in themselves attract users to interact with an advertisement on an Internet site. All coupons are stored on a service database for selection. Thus, each coupon competes with other coupons in the system for the attention of the user. The coupon must be downloaded to the consumer's computer. This means the coupon could be lost if the consumer's hard disk crashes. To redeem the coupon, it must be printed out or electronically transmitted to the merchant. In the Golden et. al. system, it is difficult (if not impossible) for the consumer to redeem the coupon if shopping electronically from a computer other than the computer to which the coupon was downloaded.

Another example is U.S. Pat. No. 5,855,007 to Jovicic et. al. This patent describes an electronic coupon communication system for generating and redeeming product discount coupons over the Internet. Again, the coupon must be stored on or printed at the user's computer.

Accordingly, there is a need for an incentive program that:
1. encourages users to interact with electronic advertisements that are associated with the present invention;
2. takes minimal time and skill to use;
3. does not require pre-registration;
4. aligns with real-world experiences;
5. is easy to implement;
6. provides easy-to-redeem offers;
7. allows tracking of sales and consumer preferences; and
8. will likely attract significant traffic to participant's website or "place of business".

There is a similar need for an interactive reward system outside of the Internet environment. For example, there are many different kinds of interactive media, such as, for example, cable TV, digital TV, web TV, interactive kiosks, automated teller machines, in-flight entertainment units, mobile telephones and gaming devices. It is common for advertisements and interactive images to be output in such interactive media. Accordingly, there is also a need for an incentive program that encourages users to interact with such promotions.

SUMMARY OF THE INVENTION

The present invention is directed to a computer-implemented reward-based advertising system and method. For convenience of description only, the present invention will be described in the context of advertisements, pages and interactive images displayed on websites. However, as will become apparent below, the present invention is not so limited to this representative embodiment, and has many uses outside of Internet webpage advertisements. As discussed in detail below, the present invention is not limited to advertising on websites, and can be used with many interactive media technologies, for example, digital TV, interactive kiosks, automatic teller machines and in-flight entertainment units.

In the representative embodiment, the present invention can be used to attract users to participant's websites. Users can collect rewards simply by interacting with an advertisement or image, e.g., clicking on a banner advertisement on a website.

An advertisement, such as a banner advertisement, that is part of the system of the present invention can be marked in a certain way, for example, with a distinctive "reward" logo, border or icon. When the user sees an advertisement with rewards marking, it will indicate to the user that a reward will be available to the user in exchange for interacting with this advertisement. Accordingly, this marking will attract the user to this advertisement as compared to other advertisements without the rewards marking. The marking makes it easy for users to determine which advertisements are worthwhile to click on.

The system can also operate successfully in cases where participating advertisements do not have the reward marking. For example, some advertisements could grant to the user a "surprise" reward if the user interacts with the advertisement. However, in this case, the user would not be likely to be attracted, in the first instance, to the advertisement because of the system of the present invention. It may, however, encourage repeated selection of a web page or interactive image.

According to the present invention, rewards can be easily redeemed and transferred.

In the representative embodiment, the available offers and rewards are maintained in a central database. This makes administration and control of the system simpler and more efficient. Additionally, it prevents users from misplacing the rewards to which they are entitled. In the representative embodiment, the central database is maintained by a system administrator.

For ease of explanation, the advertiser (i.e., the person paying for the banner advertisement) will be assumed to be the same person who creates the offer and assumes liability for redemption of the reward. To avoid confusion, this person will be called the promoter. As will be appreciated, there will be many promoters utilizing a single embodiment of the present invention and taking advantage of the central database.

From a consumer's point of view, the system is extremely simple. Assume that the user is connected to the Internet via an ISP or online service such as Compuserve or AOL and is "surfing" the World Wide Web or other online service. The user is visiting a number of websites (or other form of content location). Each website may have one or more banner advertisements. When the user sees a page, banner advertisement or interactive image with a rewards marking, it will indicate to the user that a reward will be available for interacting with this advertisement and will encourage the user to do so.

The user may then select this advertisement, for example, by clicking on the advertisement. If the user does so, the user then will instantly and automatically "receive" a reward. The reward is stored in the central database and need not be physically or electronically transferred to the user. At the end of the reward allocation process, the webpage associated with the advertisement (e.g., the webpage of the promoter) is usually (but not necessarily) displayed to the user.

There are many kinds of rewards that can be accommodated by the present invention. Examples of rewards offered by a promoter may include:

save 5% when purchasing goods at the promoter's website;

get a free X when you purchase Y at the promoter's website;

pay no shipping when you purchase goods at the promoter's website; and get two for the price of one at the promoter's webstore.

A reward may also be a physical coupon that can be printed for use/redemption at the promoter's real-world shop or premises.

A reward may include one or more conditions, for example, an expiry date, and whether the reward is "single use" or can be used more than once.

At any time, a user can visit a central website to see a list of all rewards that they have collected. Typically, that website will be maintained by the system administrator and will be electronically linked to the central database. At the central website, the user can list their current rewards, redeem a reward, or transfer a reward to another user.

The user can redeem their rewards at the promoter's website or otherwise by communicating, interacting or transacting with the promoter. An application program operated by the promoter will query the central database to determine if the user is entitled to a reward and to authenticate the reward. On authentication of the reward, the promoter will fulfill the terms of the reward.

The user can also print the reward using an output device such as a printer and redeem the benefit at a physical location or outlet. The printed reward or coupon may be authenticated with the central database using an IVR, telephone or web interface.

In short, there are three typical means to allow a user to redeem a reward. First, the user can redeem a reward by visiting the central website and claim a reward there. Second, the user can redeem a reward at a website determined by the promoter. For example, as part of an online transaction process, the promoter can have a "claim Reward" button or link which will, if selected by the user, automatically reduce the total price paid by the user or revise the transaction to reflect the redemption of the reward. If there is more than one applicable reward available, the promoter will prompt the user as to which one the user wishes to redeem. As can be seen, in this second redemption scenario, the promoter will interact with the central database to obtain information about available rewards for that user. Thirdly, the user can print a record of the reward and redeem it at a physical outlet specified by the promoter.

In the representative embodiment of the present invention, Internet technology is used to minimize inconvenience or paperwork for the user. Each user of the system is allocated a unique user number by the system administrator. This user number is stored on the user's computer, for example, in a "cookie" maintained by the user's Internet browser. (Examples of Internet browsers include Netscape Navigator and Microsoft's Internet Explorer. A cookie is a block of data that a web server stores on a client system. A copy of the cookie can be sent to a website server when the user visits the website.) The user need not know that the user number is being stored on the user's computer—this can be done seamlessly by the browser program. However, the user number can be made available to the user so that if the user's computer crashes or if the user uses another computer, the user can still have access to his or her rewards.

The user's rewards are stored in the central database indexed under the user number of the user.

There is no need for rewards to be electronically or otherwise transmitted or sent to the user. The only information that need be provided to the user is the user number, and although desirable to do so, providing the user number to the user is an optional feature.

The promoter can easily create, delete and modify offers. An offer sets out the appropriate rules or parameters that, if fulfilled by the user, will become a reward available for redemption or transfer by that user. Offers are stored in the central database. An offer is associated with one or more advertisements. The rules for an offer can specify start dates and end dates for the creation of the reward from the offer, the type of user the offer is open to, the redemption rules, etc.

An advertisement may have more than one offer associated with it. For example, U.S. residents could receive one reward and users living out of the U.S. may receive a different reward for interacting with the same advertisement.

Accordingly, one can see that the present invention has a number of benefits.

Consumers will be attracted to promoter's websites via their participating advertisements. To create an extra degree of excitement for the user, the promoter's advertisement need not specify the nature of the reward, but merely that a reward will be available. The user will be motivated to interact with the advertisement to find out what reward the user actually received. There is no registration process, so the system is available to all Internet users. There is no cost or wasted time in collecting rewards—rewards are collected seamlessly by the user in interacting with advertisements in the normal way. All rewards can be stored in the one place for easy viewing, sorting and redemption by the user. It is simple for the user to redeem a reward. The user can transfer rewards to others.

For promoters, advertisement click-through rates will increase, creating additional business opportunities. Offers easily can be created, but they can have sophisticated rules. Accordingly, the cost to use the system is low and the financial and promotional benefits can be high.

Further, the system administrator may collect valuable information relating to response and redemption rates, user demographics and profiles. In an advanced embodiment, rewards can be targeted to specific types of users based, for example, on past collection and usage of rewards and demographics.

Although described herein in relation to banner advertisements on the World Wide Web, the present invention has broader application. For example, it is not limited to banner advertisements, but can be used in conjunction with other types of interactive advertisements, web pages, interactive images and even simple hypertext links. As described in the detailed description below, the present invention can be used in conjunction with many different interactive media, such as, for example, cable TV, digital TV, web TV, interactive kiosks, automated teller machines, in-flight entertainment units, mobile telephones and gaming devices.

In the place of a cookie, a physical token (e.g., magnetic stripe card or smartcard) or user ID number may be utilized to track a user's rewards accumulation within the database.

Thus, the present invention provides a number of benefits. For example, the present invention:

1. encourages users to interact with promoter's advertisements instead of the advertisements of others;
2. takes minimal time and skill to use;
3. does not require pre-registration;
4. aligns with real-world experiences, such as collecting coupons;
5. is easy to implement;
6. is flexible in operation;
7. provides easy-to-redeem rewards;
1 allows tracking of sales and consumer preferences; and
9. will likely attract significant traffic to the promoter's website, store or other advertising or sales medium.

BRIEF DESCRIPTION OF THE DRAWINGS

FIG. 6 depicts the database structure of the central database of the present invention.

FIG. 7 is a high level flowchart representing redeeming a physical coupon or reward.

DETAILED DESCRIPTION

Figure 1:
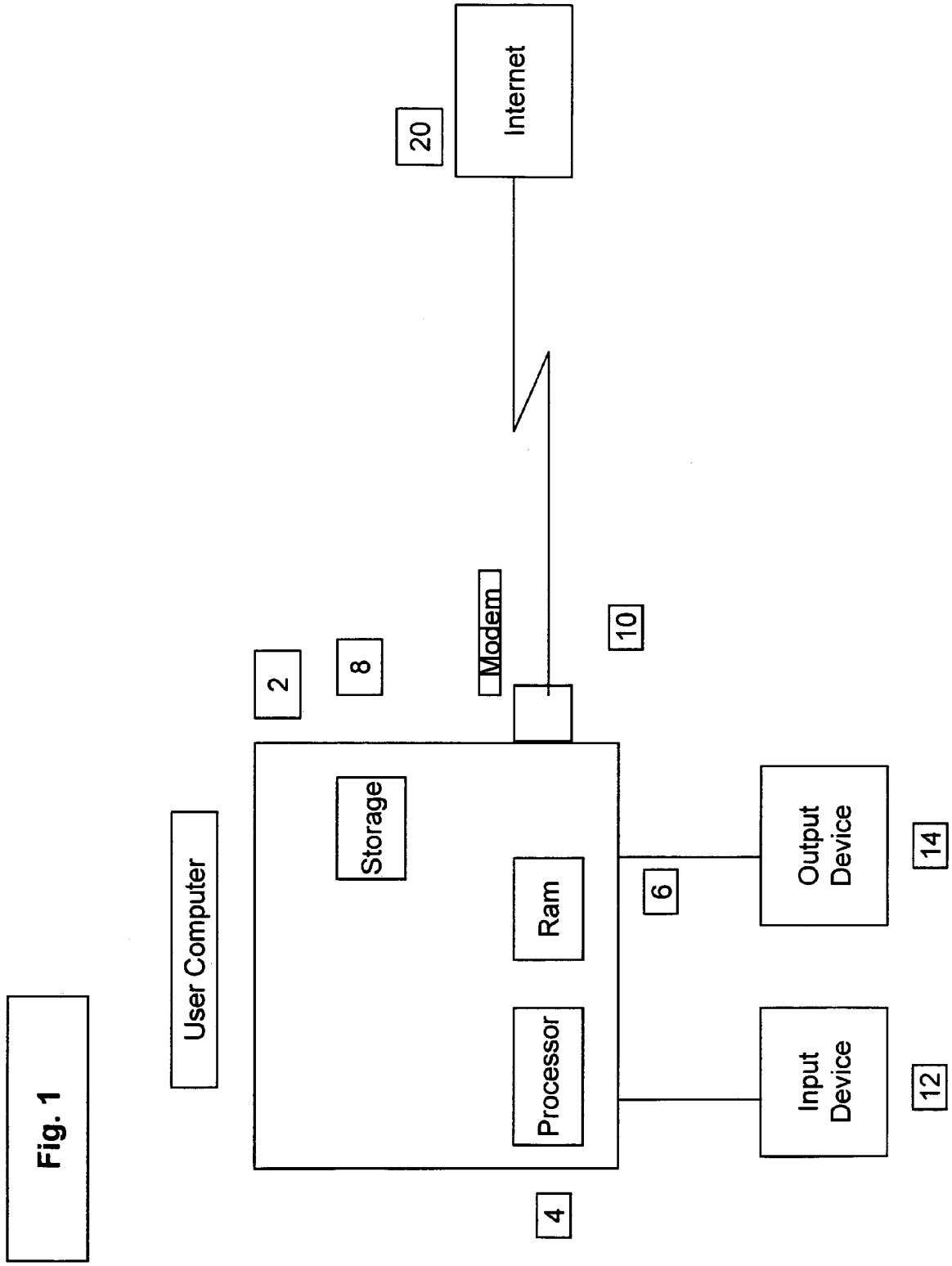
FIG. 1 is a block diagram illustrating the typical hardware components of the user's computer used in conjunction with the representative embodiment of the present invention.

Referring now to the drawings, and initially FIG. 1, there is illustrated in block diagram form the representative hardware elements of a user's computer 2. In the representative embodiment, the computer 2 is used by a typical user to access the Internet and view webpages or other content. The computer 2, such as a multimedia personal computer (MPC), comprises a processor 4, such as an Intel Pentium processor, RAM 6 and a hard disk drive and hard disk 8. Although the processor 4 can be any computer processing device, the representative embodiment of the present invention will be described herein assuming that the processor 4 is an Intel 486 processor or higher. The hard disk 8 stores an operating system, such as the Microsoft Windows 98 or Windows NT operating system, which is executed by processor 4. The present invention is not limited to the Windows operating system, and with suitable adaptation, can be used with other operating systems. For ease of explanation, the representative embodiment as described herein assumes the Windows 98 operating system.

Application program computer code is stored on a disk that can be read by drive 8 and executed by processor 4. In the representative embodiment, the user's computer 2 will have a web browser program (such as, for example, Internet Explorer or Netscape Navigator). Ideally, the browser program should be able to accept, store and send cookies.

The computer 2 is coupled to the Internet 20. Typically, the computer 2 will be coupled to the Internet 20 via a modem 10.

Coupled to the computer 2 are one or more input devices 12, such as a keyboard, mouse, joystick, trackball, microphone, scanner, and the like. Also coupled to the PC are one or more output devices 14, such as a monitor, sound speakers, printer, and the like.

Figure 2:
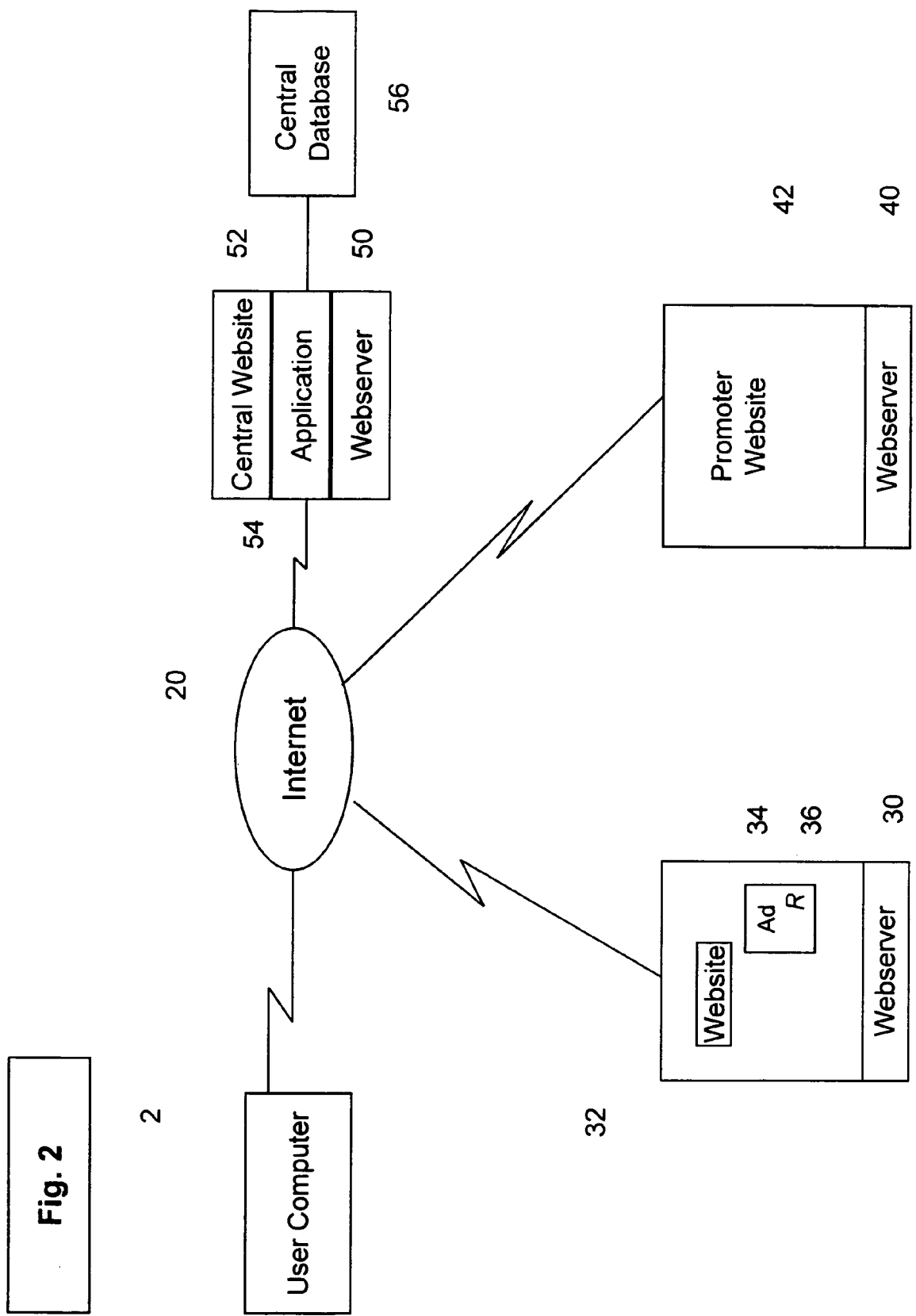
FIG. 2 is a block diagram illustrating the typical network environment of the representative embodiment.

Turning now to FIG. 2, there is illustrated a typical network environment applicable to the representative embodiment. As discussed above, the user's computer 2 is coupled to the Internet 20. Also coupled to the Internet is a computer 50 operated by a system administrator of the scheme. The system administrator has a website 52 controlled by the computer 50, typically a webserver computer. The computer 50 also runs an application program 54 (implementing, in part, functions of the present invention) and a central database 56 (discussed in detail below). The central database 56 and computer 50 are maintained by the system administrator. The central database, as discussed in detail below, stores the available offers and rewards.

The central database 56 can be implemented using a database program that can be accessed, directly or indirectly, via the Internet 20. For example, the Microsoft SQL Server or Oracle database programs can be used to implement the central database 56.

The application program 54 runs the reward application which applies logic to the parameters in the Offer Table (see FIG. 7) within the central database 56 as well as checking for unique values (if applicable). The reward application also validates and, if applicable, expires redeemed rewards.

A user, using the user computer 2, will access content, such as websites, via the Internet 20. Assume that the user is viewing a website 32. This website 32 can be made available to Internet users via a webserver computer 30 as is well known in the art. The website 32 may include an advertisement 34. The advertisement 34 advertises the goods or services of the promoter. According to the representative embodiment, the advertisement 34 can include a rewards indicator 36, such as a distinctive rewards logo, border or icon. The rewards indicator 36 signifies that the advertisement 34 is participating in the instant rewards program of the present invention.

In the representative embodiment, the promoter also has a website 42, controlled by a computer 40 that is coupled to the Internet 20. This website 42 also can be made available to Internet users via the webserver computer 40 as is well known in the art.

Figure 3:
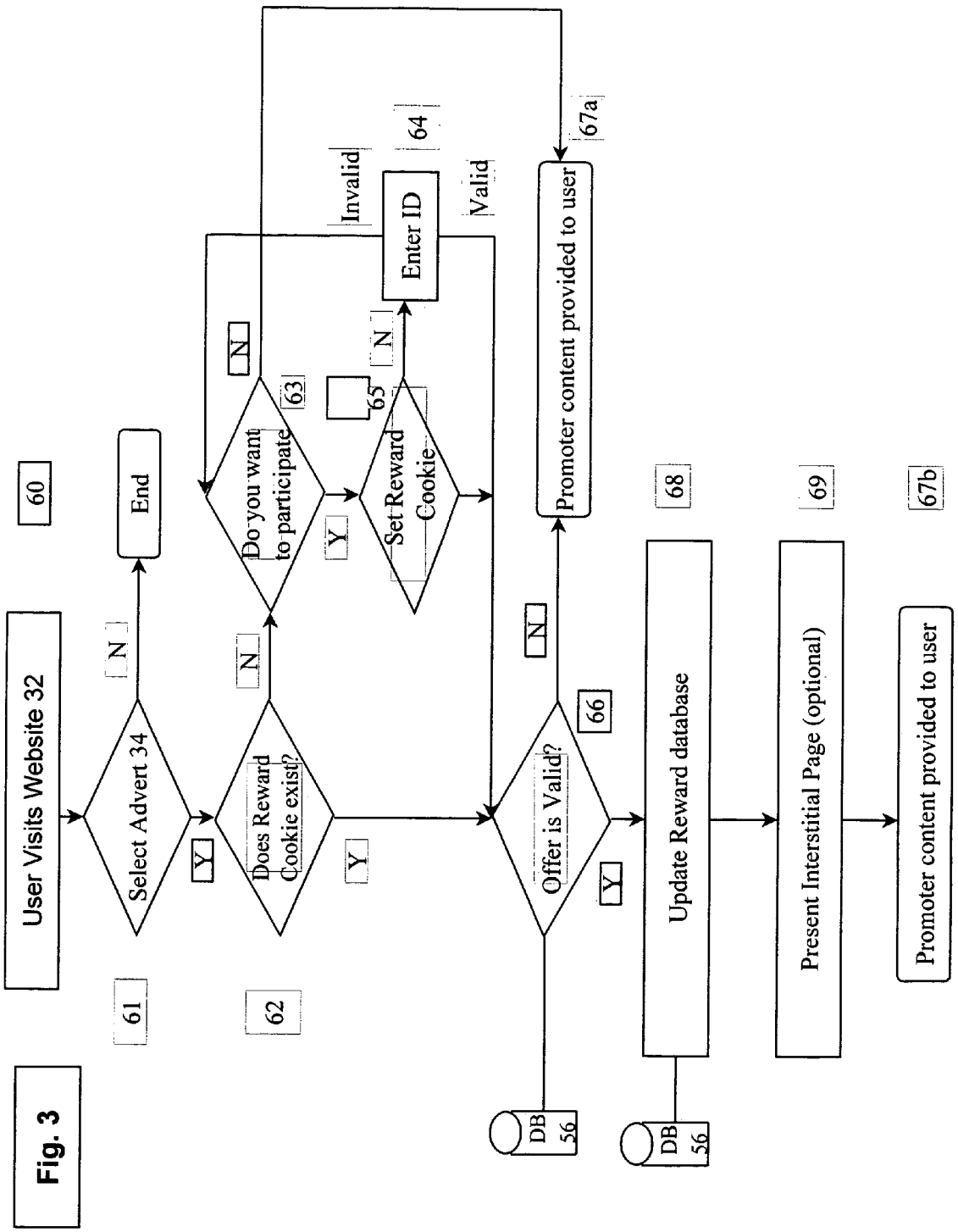
FIG. 3 is a high level flow chart representing the process of obtaining a reward according to the present invention.

FIG. 3 is a highlevel flowchart representing the process of obtaining a reward according to the present invention. The user (using the user computer 2) visits a website, e.g., website 32 (step 60). The user selects the advertisement 34 on the website 32 (step 61). (If the user does not select an advertisement, the process according to the present invention does not take place.) If the user selects the advertisement 34, the central application 54 tries to identify the user. It does this by determining if a reward cookie (that includes a unique number ID) (step 62). If there is no cookie, the user is asked if the user will participate (step 63). If the user does not wish to participate, content associated with the promoter is displayed on the user computer 2, e.g., the website 42 of the promoter (step 67*a*). If the user does wish to participate, then the central application 54 attempts to set a reward cookie (step 65). If the cookie cannot be set, the user is requested to enter an ID number (step 64). If an invalid ID is entered, the user is returned to step 63.

Once the user has been identified by the central application 54, the central application determines if the selected offer is valid (step 66). If the offer is not valid, content provided by the promoter can be provided to the user (step 67*a*).

If the offer is valid, the central database 56 is updated to show that the user has been allocated a reward (step 68).

Thus, the user receives a reward associated with the advertisement 34, as specified by the promoter (step 68), and optionally, a message is displayed to the user informing the user that he or she has received a reward (step 69). The reward is stored in the central database 56, indexed under a user number (ID) associated with the user (step 68). Content associated with the promoter is displayed on the user computer 2, e.g., the website 42 of the promoter (step 67*b*).

In further detail, when the user interacts with the advertisement 34, the user will be temporarily redirected to the central application 54 to allow for the identification of the user, issuance of the reward and security confirmation. Steps 62 through 68 are explained in more detail as follows:

When the user selects the advertisement 34 (step 61), control of the process is passed to the central application 54. The central application 54 processes the interaction in the following steps:

1. Identify the user. Each user has a unique number ID). This ID can be maintained automatically by the user computer 2 (e.g., as a cookie) or manually entered by the user each time a reward is received (step 64). The user has the responsibility to maintain their own ID. Total rewards received will be maintained in the central database 56, which will check if the user has a valid ID; and if not, present the manual entry form for entry of the ID plus registration options for first time users.

2. Associate the Reward to the ID. Checking will be done to ensure the reward has not already been received/redeemed (step 66). If everything is correct, the reward is added to the list of rewards currently maintained by the central database 56 under the ID of the user (step 68).

3. Redirect the User to the target address as specified by the Promoter and stored in the central database 56 (step 67*b*). In this example, the target address is the promoter's website 42. The central database 56 redirects the user computer 2 to the target address.

For a first time user of the system, the user is issued with the ID, which (in the representative embodiment) is a unique string comprising randomly generated alphanumeric characters, 6 to 8 characters in length. The ID can be stored by the user's browser program as a cookie (this is the default setting) or manually by the user (for example, in memory or on paper). If the ID is stored as a cookie, then all rewards are collected automatically without user intervention. If the ID is not stored as a cookie, the user is required to manually input the ID when rewards are received or redeemed by the user.

Figure 4:
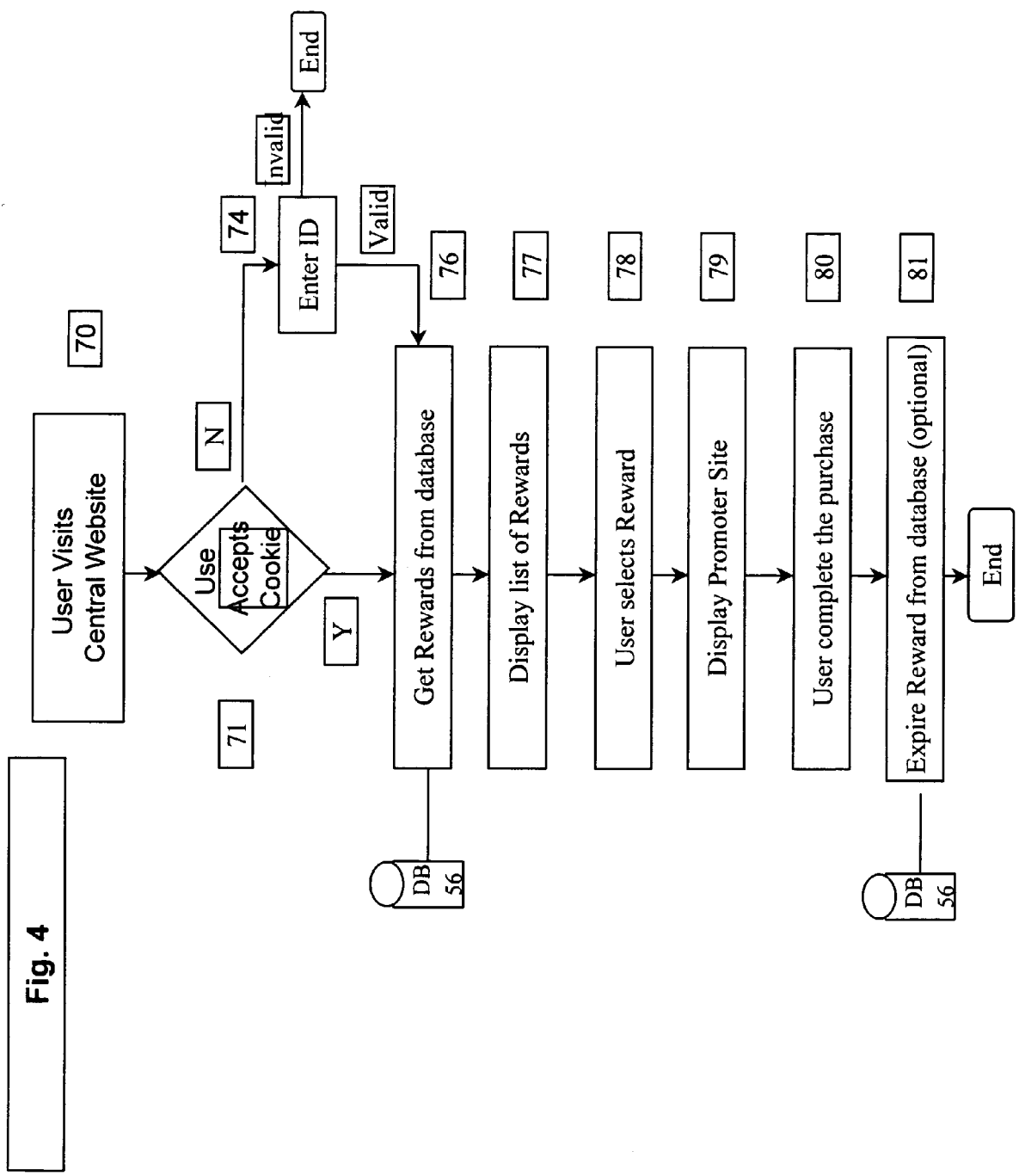
FIG. 4 is a high level flowchart representing one way of redeeming a reward according to the present invention.

There are three typical means to allow a user to redeem a reward. First, the user can redeem a reward by visiting a central website 52 and redeem a reward there. This is illustrated in FIG. 4. The user visits the central website 52 operated by the central database 56 (step 70). If the user ID is stored as a cookie, then the cookie is accepted (step 71) and this ID is seamlessly made available to the central application 54. If a cookie is not accepted, then the user is prompted to manually enter the ID (step 74). The central application determines if the ID provided is valid. Assuming that the ID is valid, the central application 54 will retrieve from the database 56 (step 76) and display a list of rewards available for that user (step 77). The user will select a reward for redemption (step 78) and will be taken to the promoter's website, e.g., website 42 (step 79). A program or script running at the promoter's website will then redeem the reward according to its conditions. For example, the user will complete the purchase. (step 80), and optionally, the reward will be expired in the central database 56.

Figure 5:
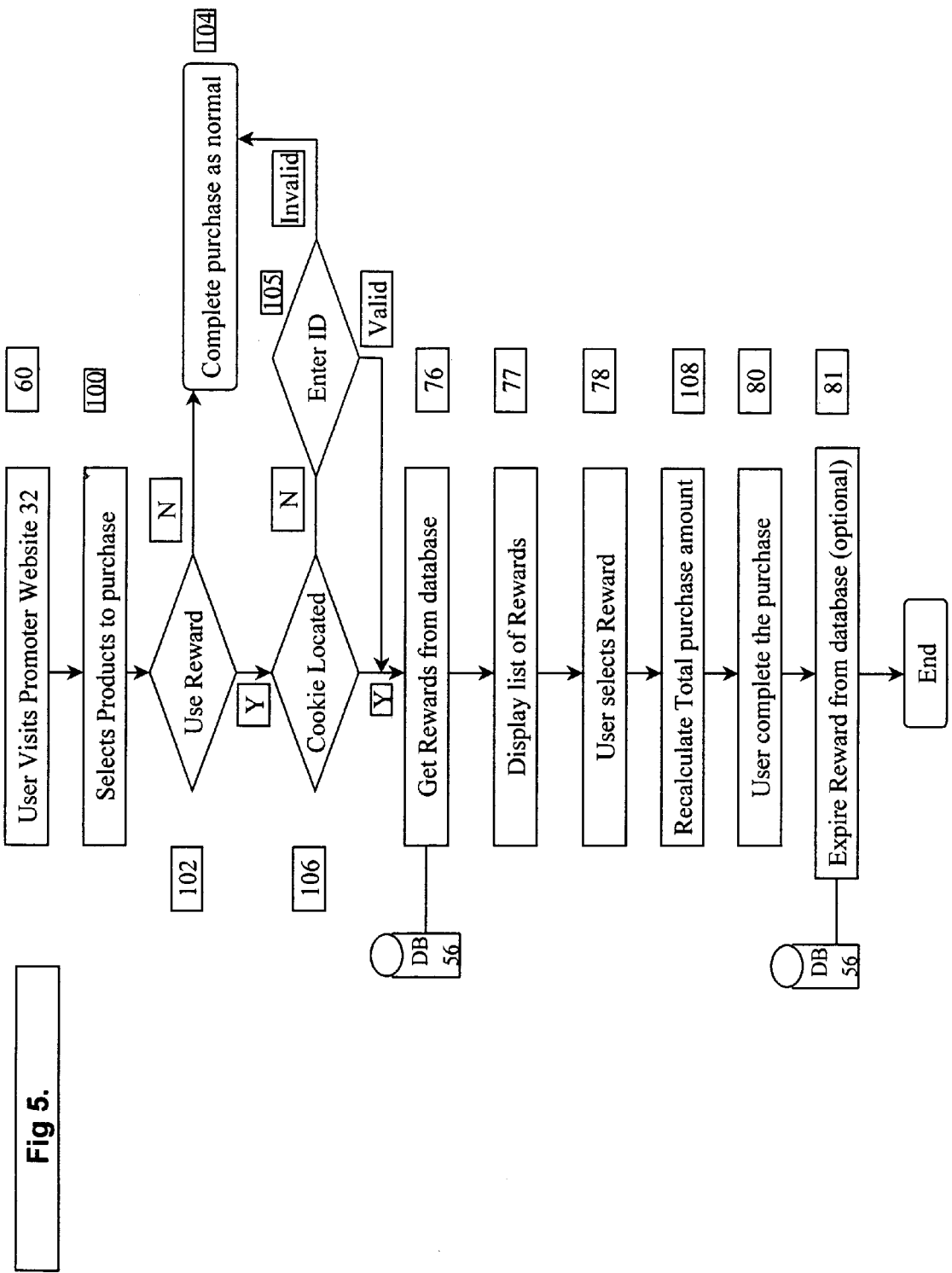
FIG. 5 is a high level flowchart representing an alternative way of redeeming a reward according to the present invention.

Secondly, the user can redeem a reward at the promoter's website (e.g., 42), as set out in FIG. 5. For example, the user is shopping on the promoter's website (step 60). A shopping script is running on the promoter's website 42 (step 100). For example, the user selects a product to purchase. The user is asked whether or not the user wishes to a claim a reward, for example, by selecting a "claim Reward" button or link on the promoter's website 42 (step 102). If the user does not claim a reward for this purchase, the purchasing process continues as it would prior to implementation of this invention (step 104). If no cookie is located, the user is asked to enter a valid ID (step 105). If the user enters an invalid ID, purchasing process will continue as normal without a reward (step 104). The shopping script will call the central application 54 to query the central database 56 to obtain a list of rewards (step 76). The central application 54 will retrieve from the database 56 (step 76) and display a list of rewards available for that user (step 77). The user will select a reward for redemption (step 78) and the total purchase price is recalculated to take into account redemption of the reward (step 108). A program or script running at the promoter's website will then redeem the reward according to its conditions. For example, the user will complete the purchase (step 80), and optionally, the reward will be expired in the central database 56 (step 81).

Thirdly, as an alternative to redeeming a reward online, the user can print a reward coupon. This is illustrated in flowchart form in FIG. 7. FIG. 7 is similar to FIG. 5 in a number of respects, so the same reference numerals are used for similar steps and are not explained again here. After selecting the reward (step 78), the user prints a reward coupon which includes a reward number or other identifier (step 120) and presents the coupon at a physical location or outlet as specified by the promoter (step 122). The printed reward or coupon may be authenticated and expired at the outlet by submitting the reward ID into the central database using an IVR, telephone or web interface (step 124).

FIG. 6 illustrates, in table format, the structure of the central database 56. In the representative embodiment, the central database 56 is a relational database comprising a number of tables. There are other tables for audit, administrative and archive purposes.

Promoters can interact with the system via a web page or a software tool.

The promoter can register and create offers via a form on the central website 52 at any time and it is the responsibility of the promoter to maintain the information relevant to the promoter in the central database 56.

The form will ask the Promoter to specify the following:
1. Target location;
2. Valid referrer locations (can be multiple) to ensure that the user interaction is not being spoofed;
3. Redemption location. When a User wants to redeem a reward, the central application 54 will redirect the user to this location.
4. Offer expiry date. When this date is reached, the central application 54 will purge all invalid rewards.

Promoters can update, delete and list their offers.

After this information is submitted, the promoter will receive an ID enabling them to alter this information at a later date. They will also receive two identifiers: one being the target, the other being the target for the redemption of the reward.

The system administrator can perform management functions on the central database 56.

The following is a functional description of common functions that are carried out according to a representative embodiment of the present invention. The functions are classed in three groups, namely, user functions (Unn), Promoter functions (Pnn) and Management functions (Mnn).

| Fn # | |
|---|---|
| | User Functions |
| U01 | Receive reward 1st time with cookie |
| U02 | Receive reward $1^{st}$ time with NO cookie |
| U03 | Reject reward 1st time with cookie |
| U05 | Receive reward |
| U06 | List rewards |
| U07 | Redeem reward - physical voucher |
| U08 | Redeem reward - Internet purchase |
| U09 | Email reward |
| U10 | Receives emailed reward |
| U11 | User changes PC |
| U12 | User enters some personal information |
| | Promoter Functions |
| P01 | Register |
| P02 | Logons on |
| P03 | Create Offer |
| P04 | List Offers |
| P05 | Update Offer |
| P06 | Delete Offers |
| P07 | Validate reward |
| P08 | Expire reward |
| | Management Functions |
| M01 | Logon |
| M02 | Runs a report |
| M03 | Suspend Promoter |
| M04 | Delete an Offer |
| M05 | Create an Offer |
| M06 | Set parameters |

U01 User Receive Reward—$1^{st}$ Time with Cookie

Pre-Condition

User is connected to Internet

User accepts cookies

Use Case

1. User is surfing the web

2. User clicks on interactive image—banner/advert/text

3. User sees 'welcome to Rewards' web page

4. User clicks 'continue'

5. User taken to target web page

Post Condition

User's receives cookie ID

[optional: User writes down ID]

Central database updated

U02 User Receive Reward—$1^{st}$ Time with No Cookie

Pre-Condition

User is connected to Internet

User does not accept cookie

Use Case

1. User is surfing the web

2. User clicks on interactive image—banner/advert/text

3. User sees 'welcome to Rewards' web page

4. User clicks on 'no cookies please'

5. User taken to target web page

Post Condition

User writes down ID

Central database updated

U03 User Rejects Reward—1$^{st}$ Time with Cookie

Pre-Condition

User is connected to Internet

User accepts cookies

Use Case

1. User is surfing the web

2. User clicks on interactive image—banner/advert/text

3. User sees 'welcome to Rewards' web page

4. User clicks 'never again'

5. User taken to target web page

Post Condition

User's receives cookie ID

User will never again see a Rewards welcome page

U05 User Receive Reward

Pre-Condition

User is connected to Internet

Use Case

1. User is surfing the web

2. User clicks on interactive image—banner/advert/text

3. If cookie not accepted—user sees interstitial 'confirmation' web page, user enters ID and clicks continue 4. If cookie accepted user sees interstitial 'confirmation' web page (flashes up for 1 sec)

5. User taken to target web page

Post Condition

Rewards database updated

U06 User List Rewards

Pre-Condition

User has received reward [u01]

Use Case

1. User visits Rewards website

2. If cookie not accepted, user enters ID

3. User reads message 'you have x rewards'

4. User clicks link

5. User sees list of rewards

6. [User can click on reward and be taken to promoter's website 42]

Post Condition

U07 User Redeem Reward—Physical Voucher

Pre-Condition

User has received reward [u01]

Use Case

1. User goes to promoter's website 42

2. User clicks 'give me voucher'

3. If cookie not accepted, user enters ID

4. Promoter validates reward

5. User sees voucher

6. User prints voucher

Post Condition

User's cookie is updated

User uses voucher in real world shopping experience. Outlet authenticates and expires reward using IVR, telephone or web interface (optional).

U08 User Redeem Reward—Internet Purchase

Pre-Condition

User has received reward [u01]

Use Case

1. User goes to promoter's website 42

2. User goes through shopping experience

3. If cookie not accepted, user enters ID

4. Promoter validates reward

5. User makes purchase and receives reward

Post Condition

User's cookie is updated

Reward updated on central database

User receives benefit

U09 User Emails Reward

Pre-Condition

User has received reward [u01]

Use Case

1. User visits Rewards website

2. User clicks 'email reward'

3. User selects reward from list

4. User enters email address of recipient

5. Users enters message [optional]

6. User clicks 'send'

Post Condition

User's cookie is updated

Reward updated on central database

Recipient receives email

Recipient processes reward [u06]

U10 User Receives Emailed Reward

Pre-Condition

User has received email

Use Case

1. User reads email

2. User clicks on link inside email

3. User sees 'welcome' screen

4. User clicks 'continue'

5. User taken to promoter web page 42

Post Condition

User's cookie is updated

Central database updated

U11 User Changes PC—Rebuild Rewards

Pre-Condition

User is connected to Internet

User is using different PC or has deleted his cookie

Use Case
1. User is surfing the web
2. User clicks on interactive image—banner/advert/text
3. User sees 'welcome to Rewards' page
4. User enters ID
5. User sees 'confirmation' web page (flashes up for 1 sec)
6. User taken to target web page Post Condition User gets all rewards relisted U12 User Enters Some Personal Information Pre-Condition User has received some rewards Admin has set parameters for personal information Use Case
1. User is surfing the web
2. User clicks on interactive image—banner/advert/text
3. User sees 'reward information' page
4. User enters a piece of information:
    Name
    Email
    Address
    Age bracket
5. User sees 'confirmation' web page (flashes up for 1 sec)
6. User taken to target web page Post Condition User gets 2 rewards—the promoter's and a system reward Central database is updated Promoter Use Cases P01 Register with Rewards Pre-Condition Promoter has an offer to promote Promoter visits Rewards website Use Case 1. Promoter clicks 'register'

2. Promoter enters details:
   Name
   Address
   Company
   Type of business
   Email
   Phone 3. Promoter clicks 'OK'

Post Condition

Promoter is registered

Promoter receives id & password

P02 Promoter Logon

Pre-Condition

Promoter is registered [p01]

Use Case

1. Promoter clicks 'Promoters'

2. Promoter enters ID

3. Promoter enters password

4. Promoter hits 'enter'

5. Promoter screen is displayed

Post Condition

P03 Promoter List Offers

Pre-Condition

Promoter is logged on [p02]

Use Case

1. Promoter reads offers

Post Condition

P04 Promoter Create Offer

Pre-Condition

Promoter is logged on [p02]

Use Case

1. Promoter clicks 'New'

2. Promoter enters offer details:
   Promoter
   Target URL
   Description of offer
   Start date
   End date
   Can offer be copied [Y|N]
   Can offer be transferred [Y|N]
   Can user clip multiple offer [Y|N]

3. Promoter clicks 'OK'

Post Condition

Promoter receives html tag to use

Central database is updated
   P05 Promoter Update Offer

Pre-Condition

Promoter is logged on [p02]

Promoter has created offer [p04]

Use Case

1. Promoter selects offer

2. Promoter changes details:
   Target URL
   Description of offer
   Start date
   End date 3. Promoter clicks 'OK'

Post Condition

Promoter receives html tag to use

Central database is updated

P06 Promoter Delete Offer

Pre-Condition

Promoter is logged on [p02]

Promoter has created offer [p04]

Use Case

1. Promoter selects offer

2. Promoter clicks 'delete'

3. Promoter confirms with 'OK'

Post Condition

Central database is updated

P07 Promoter Validates Reward

Pre-Condition

Promoter has created offer [p04]

User is redeeming a reward

Shopping script is running on promoter's web server

Use Case

1. Promoter shopping script calls central database 56

2. Database validates reward

3. Reply sent to script

Post Condition

Central database is updated

P08 Promoter Expire Reward

Pre-Condition

Promoter has validated reward [p07]

Promoter has given user the reward

Shopping script is running on promoter's web server

Use Case

4. Promoter shopping script calls central database 56 with expire reward details 5. Database expires reward 6. Acknowledgment sent to shopping script Post Condition Central database is updated Management use cases M01 Admin Logon Pre-Condition Admin has ID and password Admin visits Rewards website Use Case 1. Admin goes to hidden URL 2. Admin enters ID 3. Admin enters password 4. Admin hits 'enter'

5. Admin screen is displayed

Post Condition

Admin is logged on

M02 Admin runs a report

Pre-Condition

Admin is logged on [m01]

Use Case

1. Admin clicks 'reports'

2. Admin enters report criteria:

3. Admin clicks 'OK'

Post Condition

Admin gets report on screen

M03 Admin Suspend Promoter

Pre-Condition

Admin is logged on [m01]

Use Case

1. Admin enters promoter ID

2. Admin clicks 'Suspend'

3. Admin clicks 'OK'

Post Condition

Promoter is suspended

No confirmation screens are displayed for this promoter

M04 Admin Delete an Offer

Pre-Condition

Admin is logged on [m01]

Use Case

1. Admin enters promoter ID

2. Admin selects offer from list

3. Admin clicks 'delete'

4. Admin clicks 'OK'

Post Condition

Offer is deleted

No confirmation screens are displayed for this offer

M05 Admin Creates Offer

Pre-Condition

Admin is logged on [m01]

Use Case

1. Admin clicks 'Create Offer'

2. Admin enters information

3. Admin clicks 'OK'

Post Condition

Offer is created

M06 Admin Sets Parameter

Admin wants to offer incentives to get personal information from users. (For example; after 5 rewards have been selected, so that central database 56 can obtain and store the name of the user).

Pre-Condition

Admin is logged on [m01]

Admin has created offer [m05]

Use Case

1. Admin clicks 'Parameters'
2. Admin selects enters Offer number
3. Admin enters trigger information
4. Admin clicks 'OK'

Post Condition

Offer is created

Summary of Representative System from User's Viewpoint:
1. The User is viewing the web.
2. The User activates an interactive image 34 that is associated with an offer.
3. The User receives a reward which is stored in the central database 56.
4. The User can use a web page at a central website 52 to list all their current rewards and their status (currency and priority) or to send a reward to another User.
5. The User may redeem the reward by communicating with the promoter.

Summary of Representative System from Promoter's Viewpoint:
1. The Promoter registers online with the system
2. The Promoter registers offers and their definition in the central database 56.
3. The Promoter places an interactive image 42 on the web and a target address for the image/banner.
4. Users receive rewards by activating the image 42.
5. User redeem rewards by interacting or transacting with the Promoter.
6. As part of the redemption, the reward application tracks and authenticates the reward for the promoter.
7. On authentication of the reward the Promoter fulfills the offer.

The present invention has been described above in the context of browsing on the World Wide Web. However, the present invention is of general applicability and is not limited to this application. For example, the following are applications that will benefit from the present invention. What is common to the cited examples is that they are all networks of devices with which users can interact and rely upon the use of unique user identifiers. The software used to implement the present invention can be modified so as to perform these applications:

Automatic Teller Machine/Self-Service Kiosk/Point of Sale Terminals

The present invention can be used in conjunction with an automatic teller machine (ATM), self-service computer controlled kiosk or POS terminal. Typically, a user will insert a card (such as an ATM card, credit card, debit card or smart card) to commence a transaction. Advertising is displayed to a user on a screen (for example, a touchscreen) before, during or after a typical transaction. The advertisements can be enabled with the rewards indicator 36 and related to an offer in the central database 56. When an advertisement 34 or image is selected by the user via touchscreen or trackball, a reward is associated to the card or account that is being used. Specific screens can be used to display the rewards currently held. The card can then be used to redeem rewards to print coupons or at a point-of-sale device linked to the central rewards database.

Mobile (Cell) and Fixed Line Phones and Personal Data Assistants

The quality of screen displays on mobile and fixed line telephones and PDAs is improving. Such displays can be used to display messages and other information such as stock prices and bank account balances. A service that transmits information messages to a mobile phone could also transmit and display to the user an advertisement 34. If the user sees advertisement that has an associated rewards indicator 36, and responds, (for example, by pressing the '#' button on the telephone keypad) then their telephone ID number (such as a SIM card number) will be recorded in the database 56 as being eligible to claim the selected rewards. Accrued rewards can be reviewed via an Interactive Voice Response (IVR) or screen-based menu using the telephone. Redemption of a reward could occur automatically using Caller Line ID or entering the phone number when the user places their order via their telephone.

It will be appreciated that more than one method can be used to obtain and view rewards. For example, if the user number of the web application discussed in the detailed description above was associated with the user's mobile telephone ID number, a user could obtain, view and redeem rewards using both their web browser and mobile telephone. A single "account" could store all rewards for that user.

Stadium Seats

Advertising can be displayed during replays and close-ups via in-seat monitors at newer or refurbished stadiums. Some or all of these advertisements can include a rewards indicator 36 related to an offer in the central database 56. When an advertisement or image is selected by the user, for example, via touchscreen or special response key, a reward is associated to the seat or member number (where seating has been allocated by subscription or season pass.) Specific screens can be used to display the rewards currently held. Rewards might include member related services (e.g., future games) or in-seat services (merchandise or food offers).

Airline and Other Travel Tickets

Advertisements can be displayed during in-flight narrowcast via in-seat monitors. Some or all of these advertisements can include a rewards indicator 36 related to an offer in the central database 56. The central database 56 can be updated before departure and after landing. A local database (for example, located on the airplane) is used to temporarily store information if the airplane is out of contact with the central database 56. When an advertisement 34 or image is selected by the user, for example, via touchscreen or special response key a reward is associated to the seat or card number (where a payment or loyalty card has been used). Specific screens can be used to display the rewards currently held as stored in the local database. Rewards might include related services (eg. free in-flight telephone call, discounts at duty free store or car rental offers).

While the present invention has been particularly shown and described with reference to representative embodiments, it will be understood by those skilled in the art that various changes in form and details may be made without departing from the spirit and scope of the invention.

What is claimed is:

1. An interactive computer-controlled reward system to allow a user to redeem rewards previously collected by the user, each reward associated with a promoter and identifying a promotional incentive, the system comprising:
   a computer network;
   a central computer coupled to the computer network, the central computer comprising a database, the database storing a list of registered users and a list of rewards that have been previously collected by each user and that are available for redemption;
   a user computer coupled to the computer network, the user computer enabling the user to select a reward for redemption from the list of rewards previously collected by the user and that are available for redemption; and
   a promoter computer coupled to the computer network, the promoter computer operated by a promoter;
   wherein, when the user wishes to redeem a reward, control is passed to the central computer which identifies the user and allows the user to select a reward from the list of rewards from the database on the central computer, and thereafter control is automatically passed to the promoter computer in response thereto for the user to redeem the selected reward.

2. The system of claim 1 wherein the user computer comprises a printing device to allow the user to print a reward for physical redemption.

3. The system of claim 1 wherein the image is a banner advertisement with a distinctive reward indicator logo.

4. The system of claim 1 wherein the computer network is the Internet, and the central computer is a webserver, and the promoter computer is a webserver.

5. The system of claim 1 wherein the user computer includes a cookie that stores a user ID.

6. The system of claim 1 wherein the user can access the central computer to transfer a reward on the list of rewards to another registered user.

* * * * *